United States Patent
Kim et al.

(10) Patent No.: US 12,355,481 B2
(45) Date of Patent: Jul. 8, 2025

(54) RADIO FREQUENCY INTEGRATED CIRCUIT AND COMMUNICATION DEVICE INCLUDING THE INTEGRATED CIRCUIT

(71) Applicant: Samsung Electronics Co., Ltd., Suwon-si (KR)

(72) Inventors: Jung Woo Kim, Seoul (KR); Jae Min Kim, Suwon-si (KR); Hyung Gi Kim, Hwaseong-si (KR); Sang Wook Han, Seoul (KR); Ho Rang Jang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 556 days.

(21) Appl. No.: 17/588,725

(22) Filed: Jan. 31, 2022

(65) Prior Publication Data

US 2022/0352921 A1 Nov. 3, 2022

(30) Foreign Application Priority Data

Apr. 30, 2021 (KR) .................. 10-2021-0056704

(51) Int. Cl.
*H04B 1/403* (2015.01)
*H04B 7/06* (2006.01)

(52) U.S. Cl.
CPC ........... *H04B 1/403* (2013.01); *H04B 7/0617* (2013.01)

(58) Field of Classification Search
CPC .............................. H04B 1/403; H04B 7/0617
See application file for complete search history.

(56) References Cited

U.S. PATENT DOCUMENTS

| 5,511,069 A | 4/1996 | England et al. |
| 7,580,684 B2 | 8/2009 | Cyr et al. |
| 9,338,823 B2 | 5/2016 | Saban et al. |

(Continued)

OTHER PUBLICATIONS

European Search Report dated Sep. 20, 2022 issued in corresponding European Appln. No. 22159284.3.

(Continued)

*Primary Examiner* — Yuwen Pan
*Assistant Examiner* — Daniel Christian Paglia
(74) *Attorney, Agent, or Firm* — Harness, Dickey & Pierce, P.L.C.

(57) ABSTRACT

Provided is radio frequency integrated circuit (RFIC). The radio frequency integrated circuit (RFIC) comprises a plurality of transceiver IPs (intellectual property), wherein each transceiver IP includes an analog mixer configured to perform frequency adjustment on a signal input thereto, and a filter configured to perform filtering on the signal having the adjusted frequency based on a predetermined (or alternatively desired) band, a plurality of registers corresponding to the plurality of transceiver IPs, respectively; wherein the plurality of registers are configured to generate a plurality of control signals for controlling the plurality of transceiver IPs, respectively, a memory configured to store therein a plurality of register addresses and a plurality of register data on the plurality of registers, respectively in a form of a lookup table and a processor configured to receive a command related to the lookup table from an external component, and to control the plurality of registers based on the lookup table.

20 Claims, 18 Drawing Sheets

(56) References Cited

U.S. PATENT DOCUMENTS

| | | |
|---|---|---|
| 10,162,990 B2 | 12/2018 | Kherani et al. |
| 10,305,533 B2 | 5/2019 | Mizokami et al. |
| 10,408,919 B2 | 9/2019 | Trotta et al. |
| 11,424,539 B2 * | 8/2022 | Alpman .................. H01Q 5/47 |
| 2015/0045083 A1 | 2/2015 | Nonin |
| 2015/0102911 A1 | 4/2015 | Haruta |
| 2015/0124634 A1 | 5/2015 | Harel et al. |
| 2020/0091608 A1 | 3/2020 | Alpman et al. |
| 2021/0099197 A1 | 4/2021 | Wang et al. |

OTHER PUBLICATIONS

European Office Action dated Oct. 4, 2022 issued in corresponding European Appln. No. 22159284.3.

\* cited by examiner

FIG. 18

| SCS [kHz] | Ts [nsec] | TTI [usec] | OFDM Symbol [usec] | CP length [usec] | |
|---|---|---|---|---|---|
| | | | | 1st, 8th | others |
| 15 | 32.552 | 1000 | 66.667 | 5.208 | 4.688 |
| 30 | 16.276 | 500 | 33.333 | 2.604 | 2.344 |
| 60 | 8.138 | 250 | 16.667 | 1.302 | 1.172 |
| 120 | 4.069 | 125 | 8.333 | 0.651 | 0.586 |
| 240 | 2.035 | 62.5 | 4.167 | 0.326 | 0.293 |

RADIO FREQUENCY INTEGRATED CIRCUIT AND COMMUNICATION DEVICE INCLUDING THE INTEGRATED CIRCUIT

CROSS-REFERENCE TO RELATED APPLICATION

This application claims priority from Korean Patent Application No. 10-2021-0056704 filed on Apr. 30, 2021 in the Korean Intellectual Property Office, and all the benefits accruing therefrom under 35 U.S.C. 119, the contents of which in its entirety are herein incorporated by reference.

BACKGROUND

Field

The present disclosure relates to a radio frequency integrated circuit and a communication device including the integrated circuit.

Description of Related Art

Efforts are being made to develop an improved 5G communication system or pre-5G communication system to meet increasing demand for wireless data traffic after commercialization of a 4G communication system. For this reason, the 5G communication system or the pre-5G communication system is referred to a Beyond 4G Network communication system or a Post LTE system. In order to achieve a high data transmission rate, it is being considered that the 5G communication system is implemented in a mmWave band, for example, 28 gigabytes (28 GHz) band. In order to alleviate a path loss of a radio wave in the mmWave band and increase a propagation distance of the radio wave in the 5G communication system, beamforming, massive MIMO, full-dimensional MIMO (FD-MIMO), array antenna, analog beam-forming, and large-scale antenna schemes are being discussed.

The mobile communication system has reached a stage where the system may provide high-speed data communication services as well as voice communication, thanks to rapid development thereof. In recent years, work for a standard for a NR (new radio) system in a 3GPP (3rd Generation Partnership Project) as one of the next-generation mobile communication systems is in progress. The NR system is being developed to meet various network requirements and achieve a wider range performance. For example, the NR system may implement communication in the mmWave band (24.25 GHz to 100 GHz). According to the communication band which becomes higher due to the standards, higher-speed processing of a communication device may be desirable.

SUMMARY

A purpose of the present disclosure is to provide a radio frequency integrated circuit in which a time duration for which setting operations on a plurality of transceiver IPs (intellectual property) has been completed is reduced.

A purpose of the present disclosure is to provide a communication device including a radio frequency integrated circuit in which a time duration for which setting operations on a plurality of transceiver IPs has been completed is reduced.

A purpose of the present disclosure is to provide a communication device including a modem whose operation performance is improved using a pipelining configuration.

Purposes according to the present disclosure are not limited to the above-mentioned purpose. Other purposes and advantages according to the present disclosure that are not mentioned may be understood based on following descriptions, and may be more clearly understood based on example embodiments according to the present disclosure. Further, it will be easily understood that the purposes and advantages according to the present disclosure may be realized using means shown in the claims and combinations thereof.

According to an aspect of the present disclosure, there is provided a radio frequency integrated circuit (RFIC) comprising a plurality of transceiver IPs (intellectual property), wherein each transceiver IP includes an analog mixer configured to perform frequency adjustment on a signal input thereto, and a filter configured to perform filtering on the signal having the adjusted frequency based on a predetermined or alternatively, desired band, a plurality of registers corresponding to the plurality of transceiver IPs, respectively; wherein the plurality of registers are configured to generate a plurality of control signals for controlling the plurality of transceiver IPs respectively, a memory configured to store therein a plurality of register addresses and a plurality of register data on the plurality of registers, respectively in a form of a lookup table and a processor configured to receive a command related to the lookup table from an external component, and to control the plurality of registers based on the lookup table.

According to an aspect of the present disclosure, there is provided a communication device comprising a radio frequency integrated circuit (RFIC) including a plurality of transceiver IPs, wherein each transceiver IP includes a filter configured to perform filtering on a signal input thereto, based on a predetermined or alternatively, desired band, and an analog mixer configured to perform frequency adjustment on the input signal, a plurality of registers configured to generate a plurality of control signals for controlling the plurality of transceiver IPs, respectively, a latch configured to provide the plurality of control signals to the plurality of transceiver IPs, respectively, and a first processor configured to provide a timing signal to the latch to control the latch and a modem including a second processor configured to provide the input signal and a command corresponding to the plurality of control signals to the radio frequency integrated circuit and a global timer configured to provide a sync adjustment signal to the radio frequency integrated circuit, wherein the sync adjustment signal is configured to adjust a timing at which the timing signal is input to the latch.

According to an aspect of the present disclosure, there is provided a communication device comprising an antenna module including a plurality of antennas configured to receive a plurality of radio signals, and a beamformer configured to perform beamforming on the plurality of radio signals to generate an input signal, a radio frequency integrated circuit (RFIC) configured to perform frequency adjustment on the input signal and perform filtering on the input signal having the adjusted frequency, based on a predetermined or alternatively, desired band, thereby providing a baseband signal; and a modem configured to receive the baseband signal from the radio frequency integrated circuit and provide a command configured to control the frequency adjustment and the filtering to the radio frequency integrated circuit, wherein the radio frequency integrated circuit (RFIC) includes a plurality of transceiver IPs, wherein each transceiver IP includes an analog mixer for performing the frequency adjustment on the input signal, and a filter for performing configured to filter the input signal having the adjusted frequency, a plurality of registers corresponding to the plurality of transceiver IPs, respectively; wherein the plurality of registers are configured to generate a plurality of control signals for controlling the plurality of transceiver IPs, respectively, a memory configured to store therein a plurality of register addresses and a plurality of register data on the plurality of registers, respectively in a form of a lookup table and a processor configured to receive a command related to the lookup table from an external component, and to control the plurality of registers based on the lookup table.

BRIEF DESCRIPTION OF DRAWINGS

The above and other aspects and features of the present disclosure will become more apparent by describing in detail example embodiments thereof with reference to the attached drawings, in which:

FIG. 18 is a graph for illustrating an effect of a communication device according to some example embodiments of the present disclosure.

DETAILED DESCRIPTION

Figure 1:
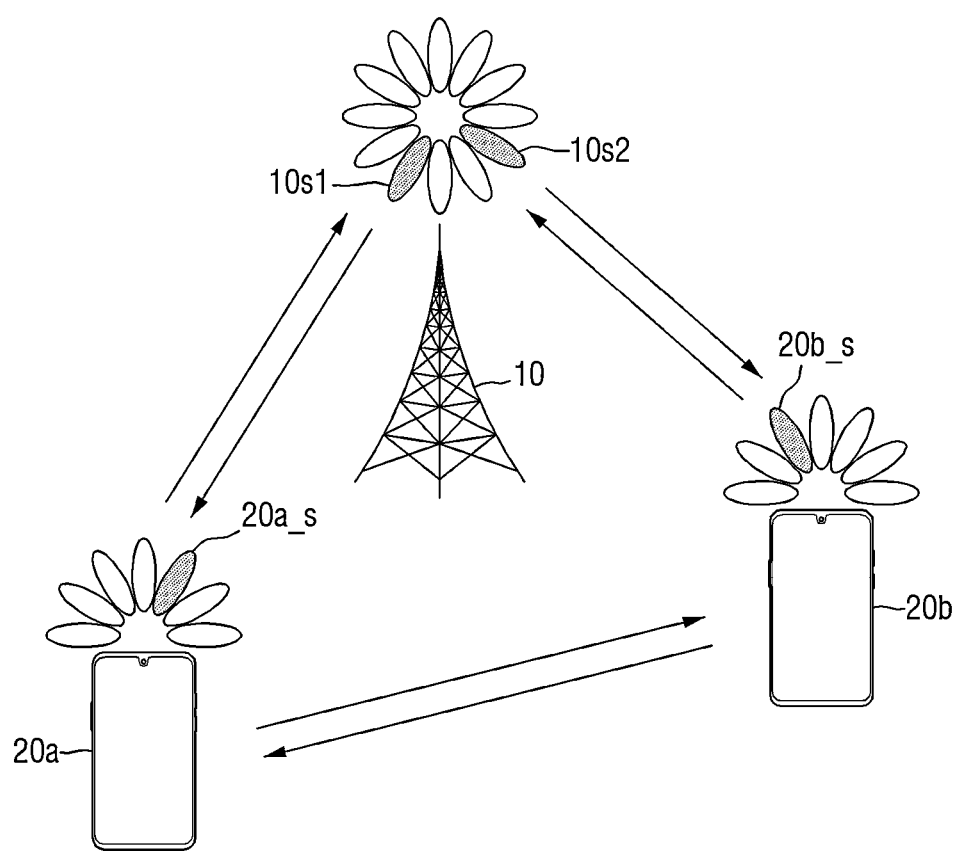
FIG. 1 is a diagram for illustrating a wireless communication system according to some example embodiments of the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various example embodiments are illustrated and described further below. It will be understood that the description herein is not intended to limit the claims to the specific example embodiments described. On the contrary, it is intended to cover alternatives, modifications, and equivalents as may be included within the spirit and scope of the present disclosure as defined by the appended claims.

The terminology used herein is for the purpose of describing particular example embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when certain example embodiments may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various example embodiments of the present disclosure may be partially or entirely combined with each other, and may be technically associated with each other or operate with each other. The example embodiments may be implemented independently of each other and may be implemented together in an association relationship.

Hereinafter, example embodiments according to the technical idea of the present disclosure will be described with reference to the accompanying drawings. In descriptions of FIG. 1 to FIG. 18, the same reference numerals are used for the same or substantially the same components, and duplicate descriptions of the same components are omitted.

Hereinafter, for convenience of descriptions, the present disclosure uses terms and names defined in the 3GPP LTE (3rd Generation Partnership Project Long Term Evolution) standard, or modifications thereof. However, the present disclosure may not be limited by the terms and names, and may be equally applied to a system conforming to other standards. In particular, the present disclosure may be applicable to a 3GPP NR *5G mobile communication standard). In addition, the present disclosure may be applied to intelligent services based on 5G communication technology and IoT-related technologies, such as a smart home, a smart building, a smart city, a smart car or a connected car, or healthcare, digital education, retail, and security and safety related services. etc.

FIG. 1 is a diagram for illustrating a wireless communication system according to some example embodiments of the present disclosure.

Referring to FIG. 1, FIG. 1 illustrates a base station 10, a terminal 20a, and/or a terminal 20b as some of nodes using a radio channel in a wireless communication system. FIG. 1 shows only one base station. However, other base stations identical or similar to the base station 10 may be further included in the system.

The base station 10 acts as a network infrastructure that provides wireless access to the terminals 20a and 20b. The base station 10 has a coverage defined as a certain geographic area based on a distance within which the base station is capable of transmitting a signal. The base station 10 may be referred to as 'access point (AP)', 'eNodeB (eNB)', '5G node (5th generation node)', 'GnodeB (next generation nodeB; gNB)', 'wireless point', 'transmission/reception point (TRP)' or other terms having an equivalent technical meaning.

Each of the terminal 20a and the terminal 20b refers to a device used by a user, and performs communication with the base station 10 over a radio channel. A link from the base station 10 to the terminal 20a or terminal 20b is referred to as a downlink (DL), while a link from the terminal 20a or the terminal 20b to the base station 10 is referred to as an uplink (UL). Further, the terminal 20a and the terminal 20b may communicate with each other over a radio channel. In this connection, a link between the terminal 20a and the terminal 20b (device-to-device link; D2D) is referred to as a sidelink. The sidelink may be interchangeable with a PC5 interface. In some example embodiments, at least one of the terminal 20a and the terminal 20b may operate without user involvement. That is, at least one of the terminals 20a and 20b may perform machine type communication (MTC), and may not be carried by the user. Each of the terminal 20a and the terminal 20b may be referred to as 'user equipment (UE)', 'mobile station', 'subscriber station', 'remote terminal', 'wireless terminal', or 'user device' or other terms having an equivalent technical meaning.

The base station 10, the terminal 20a, and the terminal 20b may transmit and receive radio signals in a mmWave band (e.g., 28 GHz, 30 GHz, 38 GHz, and 60 GHz). In this connection, in order to improve a channel gain, the base station 10, the terminal 20a, and/or the terminal 20b may perform beamforming. In this connection, the beamforming may include transmit beamforming and receive beamforming. That is, the base station 10, the terminal 20a, and/or the terminal 20b may impart directivity to a transmit signal or a received signal. To this end, the base station 10 and/or the terminals 20a and 20b may select serving beams $10s1$, $10s2$, $20a\_s$, and $20b\_s$ via a beam search or beam management procedure. After the serving beams $10s1$, $10s2$, $20a\_s$, and $20b\_s$ are selected, subsequent communication may be performed using a resource having a QCL (quasi co-located) relationship with a resource on which the serving beams $10s1$, $10s2$, $20a\_s$, and $20b\_s$ are transmitted.

When large-scale characteristics of a channel over which a symbol on a first antenna port is carried may be inferred from a channel over which a symbol on a second antenna port is carried, the first antenna port and the second antenna port may be evaluated to be in the QCL relationship with each other. For example, the large-scale characteristics may include at least one of a delay spread, a Doppler spread, a Doppler shift, an average gain, an average delay, and a spatial receiver parameter.

Figure 2:
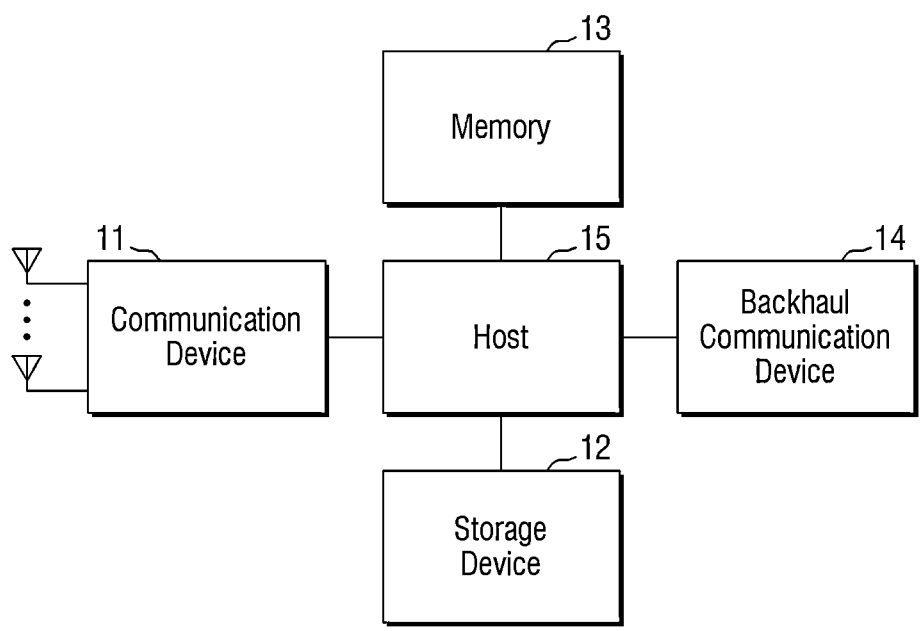
FIG. 2 is a block diagram for illustrating a base station according to some example embodiments of the present disclosure.

FIG. 2 is a block diagram for illustrating a base station according to some example embodiments of the present disclosure. Hereinafter, ' . . . device', ' . . . unit', ' . . . module', or ' . . . er' may mean a unit that carries out at least one function or operation, and may be implemented as hardware or software, or a combination of hardware and software.

Referring to FIG. 2, the base station 10 includes a communication device 11, a storage device 12, a memory 13, a backhaul communication device 14, and/or a host device 15.

The communication device 11 performs functions of transmitting and receiving signals over a radio channel. For example, the communication device 11 performs a conversion function between a baseband signal and a bit stream according to a physical layer standard of the system. For example, during data transmission, the communication device 11 may encode and modulate a transmit bit stream to generate complex symbols. Further, upon data reception, the communication device 11 reconstructs a receive bit stream via demodulation and decoding of the baseband signal.

Further, the communication device 11 up-converts a baseband signal to an RF (radio frequency) band signal, transmits the RF band signal via an antenna, and down-converts a RF band signal received via the antenna into a baseband signal. To this end, the communication device 11 may include a transmit filter, a receive filter, an amplifier, a mixer Mixer, a phase locked loop, a digital to analog converter, an analog to digital converter, and/or the like. Further, the communication device 11 may include a plurality of transmission and reception paths. Furthermore, the communication device 11 may include at least one antenna array composed of a plurality of antenna elements.

The communication device 11 may be composed of a digital front end and an analog front end in terms of hardware. An analog unit may be composed of a plurality of sub-units according to an operation power, an operation frequency, and the like. The digital front end may be implemented using at least one processor, for example, a DSP (digital signal processor).

The communication device 11 transmits and receives a signal as described above. Accordingly, an entirety or a portion of the communication device 11 may be referred to as 'a transmitter', 'a receiver' or a 'transceiver'. Further, in following descriptions, transmission and reception performed over the radio channel may include example embodiments that the transmission and reception is performed by the communication device 11.

The storage device 12 stores therein data such as a basic program, an application program, and setting information for operation of the base station. The storage device 12 may include a volatile memory, a non-volatile memory, and/or a combination of volatile and non-volatile memories. Further, the storage device 12 provides the stored data in response to a request from the host device 15.

The host device 15 may access the memory 13 and execute instructions and/or data loaded into memory 13. The memory 13 may be embodied as DDR SDRAM (Double Data Rate Synchronous DRAM), HBM (High Bandwidth Memory), HMC (Hybrid Memory Cube), DIMM (Dual In-line Memory Module), Optane DIMM, and/or NVMDIMM (Non-Volatile DIMM).

The backhaul communication device 14 provides an interface for communicating with other nodes in a network. That is, the backhaul communication device 14 converts a bit stream transmitted from the base station to another node, for example, another access node, another base station, a higher node, a core network, etc. into a physical signal, and converts a physical signal received from another node into a bit stream.

The host device 15 controls overall operations of the base station. For example, the host device 15 transmits and receives a signal via the communication device 11 or via the backhaul communication device 14. Further, the host device 15 writes data to the storage device 12 or read data therefrom. Further, the host device 15 may perform functions of a protocol stack required in a communication standard. According to another implementation, the protocol stack may be included in the communication device 11. To this end, the host device 15 may include at least one processor. According to various example embodiments, the host device 15 may control the base station to perform operations according to various example embodiments as described below.

Figure 3:
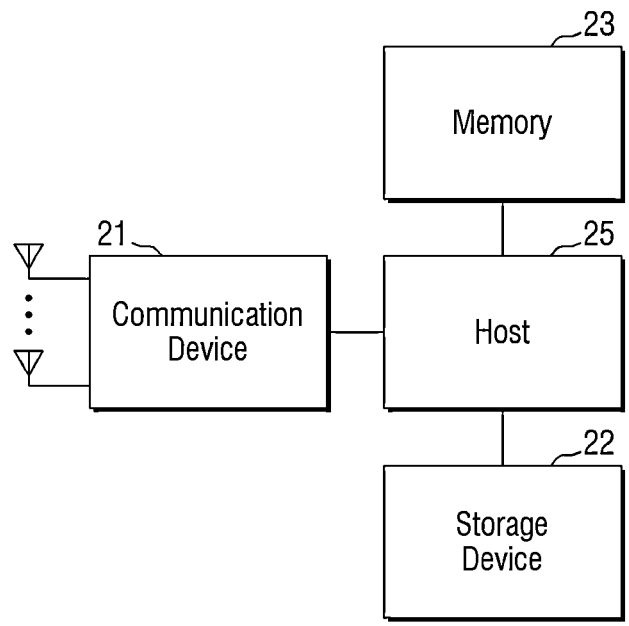
FIG. 3 is a block diagram for illustrating a terminal according to some example embodiments of the present disclosure.

FIG. 3 is a block diagram for illustrating a terminal according to some example embodiments of the present disclosure.

Referring to FIG. 3, each of the terminals 20a and 20b includes a communication device 21, a storage device 22, a memory 23 and/or a host device 25. The communication device 21 performs functions of transmitting and receiving signals over a radio channel. For example, the communication device 21 performs a conversion function between a baseband signal and a bit stream according to a physical layer standard of the system. For example, during data transmission, the communication device 21 may encode and modulate a transmit bit stream to generate complex symbols. Further, during data reception, the communication device 21 reconstructs a receive bit stream via demodulation and decoding of the baseband signal. Further, the communication device 21 up-converts a baseband signal to an RF band signal, transmits the RF band signal via an antenna, and down-converts a RF band signal received through the antenna into a baseband signal. For example, the communication device 21 may include a transmit filter, a receive filter, an amplifier, a mixer Mixer, a phase locked loop, a digital to analog converter, an analog to digital converter, and/or the like.

Further, the communication device 21 may include a plurality of transmission and reception paths. Furthermore, the communication device 21 may include at least one antenna array composed of a plurality of antenna elements. The communication device 21 may include a radio frequency integrated circuit (RFIC) including a digital circuit and an analog circuit in terms of hardware. In this connection, the digital circuit and the analog circuit may be implemented into a single package. Further, the communication device 21 may include a plurality of RF chains.

Furthermore, the communication device 21 according to some example embodiments may perform beamforming using the mmWave band used in the 5G communication system, and may include a separate antenna module for performing the beamforming.

The storage device 22 stores therein data such as a basic program, an application program, and setting information for operation of each of the terminals 20a and 20b. The storage device 22 may include a volatile memory, a non-volatile memory, and/or a combination of volatile and non-volatile memories. Further, the storage device 22 provides the stored data in response to a request from the host device 25.

The host device 25 may access the memory 23 and execute instructions and/or data loaded into the memory 23. The memory 23 may be embodied as DDR SDRAM (Double Data Rate Synchronous DRAM), HBM (High Bandwidth Memory), HMC (Hybrid Memory Cube), DIMM (Dual In-line Memory Module), Optane DIMM, and/or NVMDIMM (Non-Volatile DIMM).

The host device 25 controls overall operations of each of the terminals 20a and 20b. For example, the host device 25 transmits and receives a signal via the communication device 21. Further, the host device 25 writes data to the storage device 22, or read data therefrom. In addition, the communication device 21 and the storage device 22 may perform functions of a protocol stack required in the communication standard. To this end, the communication device 21 and the storage device 22 may include at least one processor or microprocessor, or may be a portion of the processor. Further, a portion of the communication device 21 and the storage device 22 may be referred to as a CP (communication processor). According to various example embodiments, the host device 25 may control the terminals 20a and 20b to perform operations according to various example embodiments to be described later.

Figure 4:
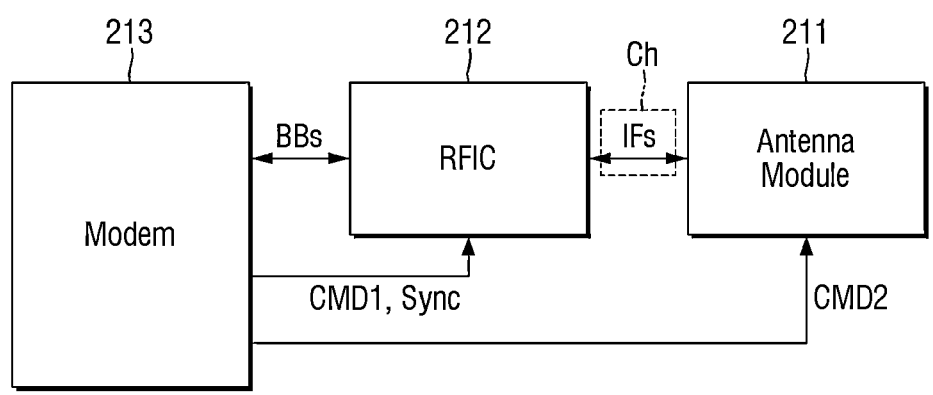
FIG. 4 is a block diagram for illustrating a communication device according to some example embodiments of the present disclosure.
Figure 5:
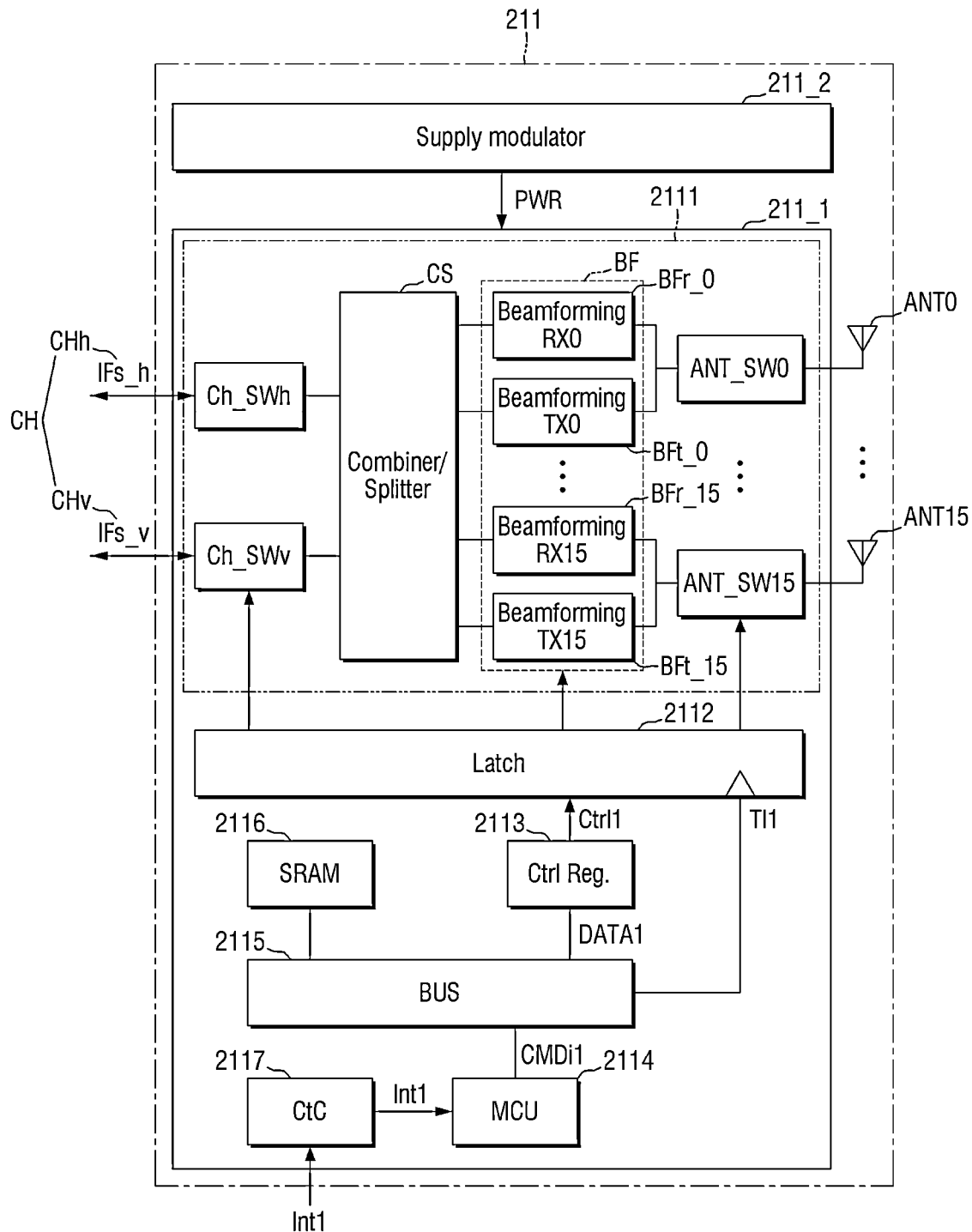
FIG. 5 is a block diagram for illustrating an antenna module according to some example embodiments of the present disclosure.
Figure 6:
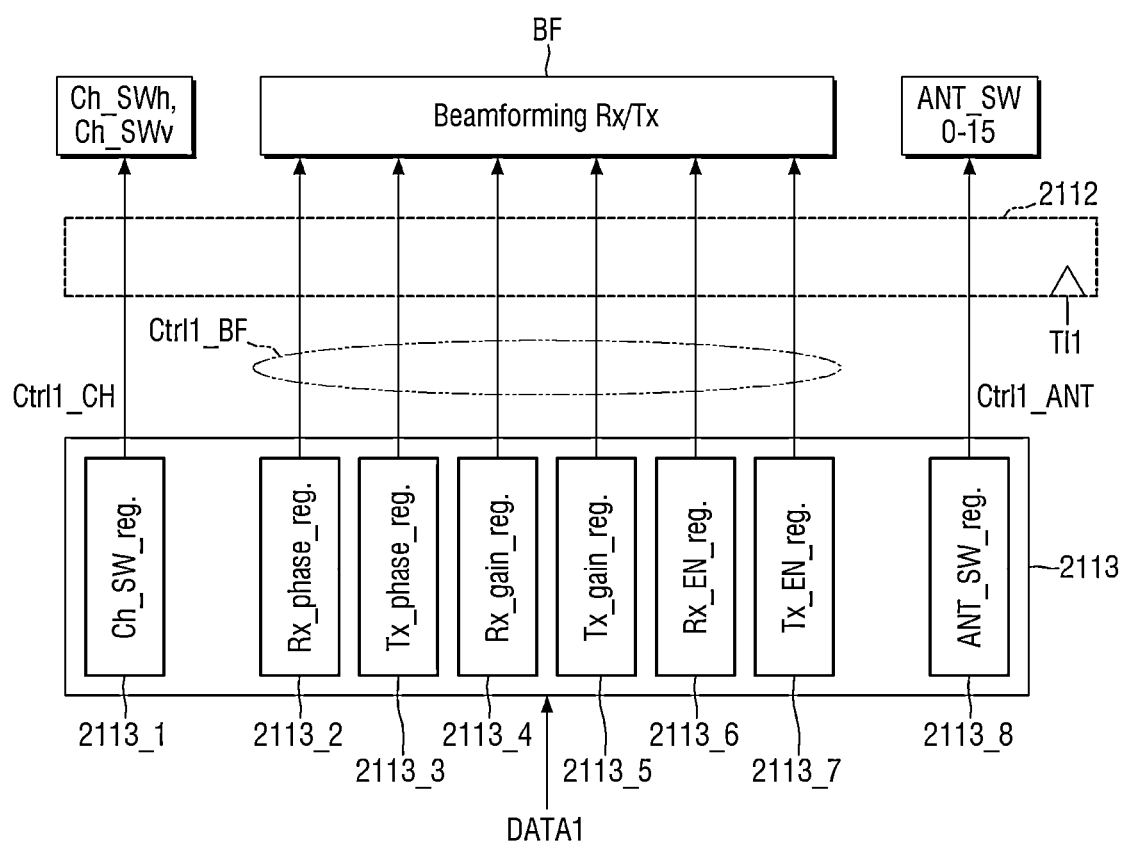
FIG. 6 is a block diagram showing a first register of FIG. 5.
Figure 7:
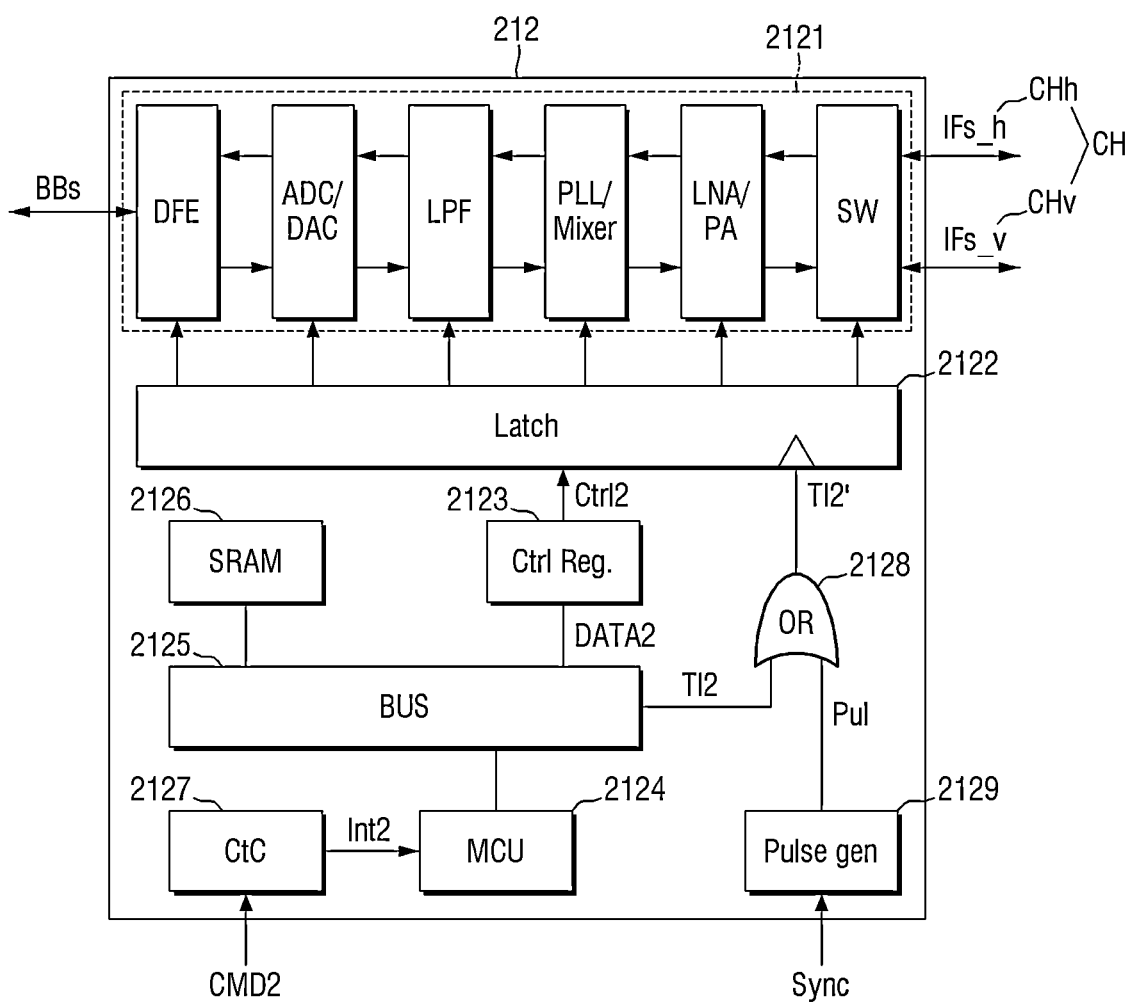
FIG. 7 is a block diagram for illustrating a radio frequency integrated circuit according to some example embodiments of the present disclosure.
Figure 8:
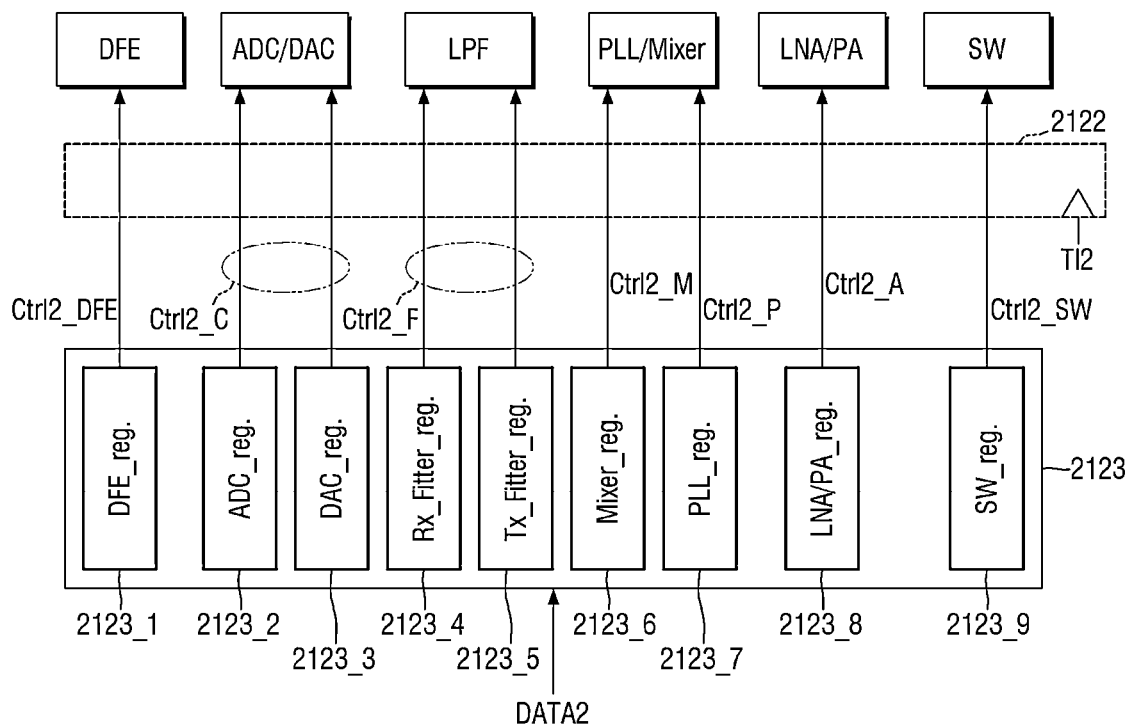
FIG. 8 is a block diagram showing a second register of FIG. 7.
Figure 9:
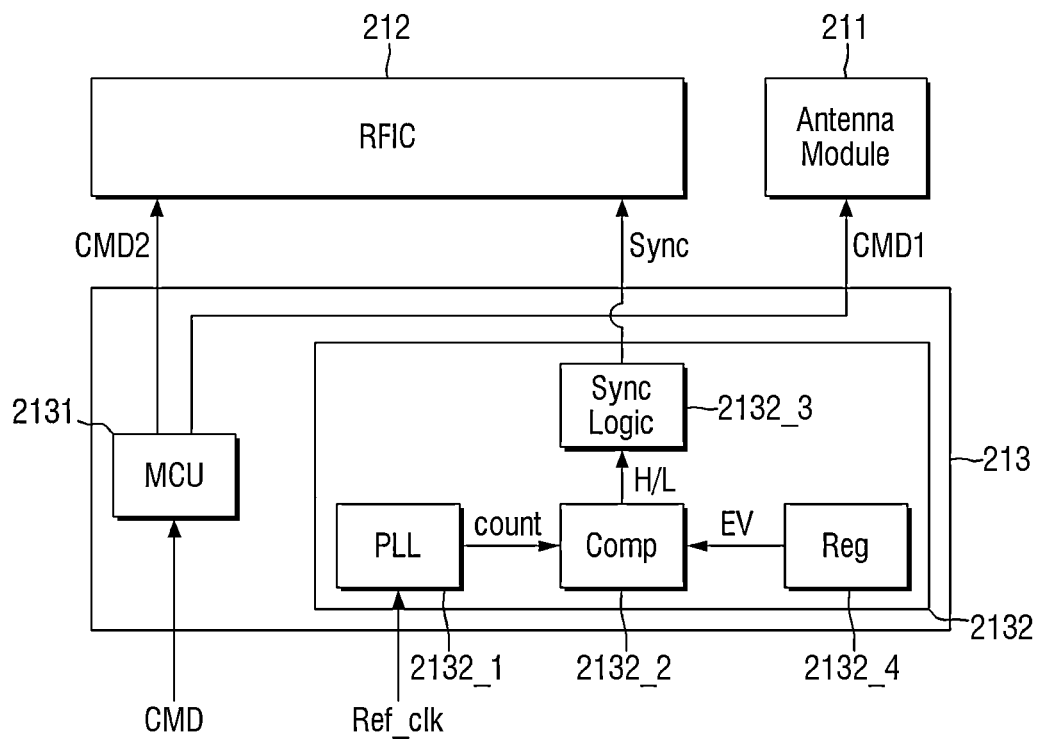
FIG. 9 is a block diagram for illustrating a modem according to some example embodiments of the present disclosure.

FIG. 4 is a block diagram for illustrating the communication device 21 according to some example embodiments of the present disclosure. FIG. 5 is a block diagram for illustrating an antenna module according to some example embodiments of the present disclosure. FIG. 6 is a block diagram to illustrate a first register 2113 of FIG. 5. FIG. 7 is a block diagram for illustrating a radio frequency integrated circuit according to some example embodiments of the present disclosure. FIG. 8 is a block diagram to illustrate a second register 2123 of FIG. 7. FIG. 9 is a block diagram for illustrating a modem according to some example embodiments of the present disclosure.

A wireless communication system has initially provided voice service, and then developed into a wide band wireless communication system that provides high-rate and high-quality packet data services, for example, based on HSPA (high speed packet access) of 3GPP, LTE (long term evolution) or E-UTRA (evolved universal terrestrial radio access), LTE-A (advanced), HRPD (high-rate packet data) of o3GPP2, UMB (ultra mobile broadband), and a communication standard such as IEEE 802.16e. Further, a communication standard of 5G or NR (new radio) is being developed as a 5G wireless communication system.

The NR system employs an OFDM (orthogonal frequency division multiplexing) scheme in the downlink (DL) and the uplink (UL). For example, the NR system employs a CP-OFDM (cyclic-prefix OFDM) scheme in the downlink, and a DFT-S-OFDM (discrete Fourier transform spreading OFDM) scheme along with CP-OFDM in the uplink. The uplink refers to a wireless link along which a terminal transmits data or a control signal to a base station. The downlink refers to a wireless link along which the base station transmits data or a control signals to the terminal. In the multiple access scheme, a time-frequency resource on which data or control information for a first user is carried does not overlap, that is, is orthogonal to a time-frequency resource on which data or control information for a second user. In this way, the data or control information of the users may be distinguished from each other.

The NR system employs a HARQ (hybrid automatic repeat request) scheme in which when a decoding failure of data occurs in an initial transmission, the data is re-transmitted using a physical layer. According to the HARQ scheme, when a receiver fails to decode data correctly, the receiver transmits NACK (negative acknowledgment) as information informing the decoding failure to a transmitter. Thus, the transmitter may retransmit corresponding data using the physical layer. The receiver may combine the data retransmitted by the transmitter with data that the receiver has previously failed to decode, thereby improving data reception performance. Further, when the receiver correctly decodes the data, the receiver transmits ACK (acknowledgment) as information informing decoding success to the transmitter. Thus, the transmitter may transmit new data.

Referring to FIG. 4 to FIG. 9, the communication device 21 may include an antenna module 211, a radio frequency integrated circuit 212, a modem 213 and/or a channel CH.

The antenna module 211 performs beamforming on an input analog signal. The antenna module 211 changes a size and a phase of a RF band signal inputted to a plurality of antennas ANT0 to ANT15 and down-converts a frequency of the signal to an intermediate band signal IFs, or changes a size and a phase of the intermediate band signal IFs input to the channel CH, and upconverts a frequency thereof to the intermediate band signal IFs. The antenna module 211 according to some example embodiments may be separated from the radio frequency integrated circuit 212 and may be connected to the channel CH.

The channel CH may include a horizontal channel CH_h and a vertical channel CH_v. Each of the vertical and horizontal channels may be embodied as a coaxial cable. However, the technical idea of the present disclosure is not limited thereto. Signals respectively transmitted to the vertical and horizontal channel maintain orthogonality therebetween.

The antenna module 211 includes a first chip 211_1 including a first transceiver IP 2111, a first latch 2112, a first register 2113, a first processor 2114, a first bus 2115, a first memory 2116, and a first inter-chip interface 2117, and/or a voltage supply device 211_2.

The first transceiver IP 2111 may be composed of a plurality of transceiver IPs. The first transceiver IP 2111 may include 0-th to 15-th antennas ANT0 to ANT15, 0-th to 15th antenna switches ANT_SW0 to ANT_SW15, beamforming blocks BF, a combiner/a splitter (CS), and channel switches CH_SWh and CH_SWv. Although each of the numbers of the antennas, the antenna switches and the beamforming blocks in the drawing is 16, this is only an example. The number of the antennas does not limit the technical idea of the present disclosure.

The first transceiver IP 2111 may be controlled by a plurality of first control signals Ctrl1 generated from the first register 2113 to be described later. Settings on the first register 2113 may be set according to the plurality of first control signals Ctrl1, so that a beamforming operation may be performed on an input signal of the antenna module 211, for example, analog beamforming may be performed thereon.

For example, a connection structure between the plurality of beamforming blocks BF and the plurality of channel switches Ch_SWh and Ch_SWv may be determined by a channel switch control signal Ctrl1_CH of a channel switch register 2113_1. Depending on the connection structure, the antenna module 211 may be implemented in various ways. For example, the plurality of beamforming blocks BF are connected to the horizontal channel CH_h or the vertical channel CH_v based on a connection relationship between the combiner/splitter and the channel switch control signal Ctrl1_CH.

Enable or disable, a gain, and a phase variation of each of receive beamforming blocks BFr_0-BFr_15 respectively in the beamforming blocks BF, and enable or disable, a gain, and a phase variation of each of transmit beamforming blocks BFt_0-BFt_15 respectively in the beamforming blocks BF may be set based on beamforming block control signals Ctrl1_BF respectively generated from a receive enable register 2113_6, a transmit enable register 2113_7, a receive gain register 2113_4, a transmit gain register 2113_5, a receive phase register 2113_2, and/or a transmit phase register 2113_3. Each beamforming block BF may perform an analog beamforming operation on the RF band signal and the intermediate band signal IFs input thereto, based on the settings as described above.

A connection structure between the plurality of beamforming blocks BF and the plurality of the antenna switches ANT_SW0 to ANT_SW15 may be determined based on the antenna switch control signal Ctrl1_ANT of the antenna switch register 2113_8. The antenna module 211 may be implemented in various ways based on the connection structure. For example, each of the 0-th to 15-th antenna ANT_0 to ANT_15 is connected to each of the receive beamforming blocks BFr_0 to BFr_15 or each of the transmit beamforming blocks BFt_0-BFt_15 based on the antenna switch control signal Ctrl1_ANT.

The first latch 2112 provides the first control signal Ctrl1 output from the first register 2113 to the first transceiver IP 2111 according to a first timing signal TI1. The first timing signal TI1 is provided from the first processor 2114 which will be described later. The first processor 2114 provides the first timing signal TI1 to control the first latch 2112.

The first register 2113 may be composed of a plurality of registers. Each register may correspond to each transceiver IP. Each of the registers included in the first register 2113 may output a 32-bit sized control signal. However, the technical idea of the present disclosure is not limited thereto.

In one example, when a control signal of 4 bits is required to control a gain of each of the 0-th to 15-th receive beamforming blocks BFr_0 to BFr_15, the receive gain register 2113_4 may include a register having two 32-bit sized outputs in order to control a gain of all of the receive beamforming blocks BFr_0 to BFr_15. Therefore, according to an output bit size of the register and the number of transceiver IPs, an arrangement of registers may be implemented in various forms.

The first register 2113 may include the channel switch register 2113_1, the receive phase register 2113_2, the transmit phase register 2113_3, the receive gain register 2113_4, the transmit gain register 2113_5, the receive enable register 2113_6, the transmit enable register 2113_7, and the antenna switch register 2113_8.

The first register 2113 receives first data DATA1 in a form of a lookup table stored in the first memory 2116 under control of the first processor 2114. The first register 2113 outputs the first control signal Ctrl1 based on the first data DATA1.

The first processor 2114 receives a first command CMD1 for control of the first transceiver IP 2111 as a first interrupt command Int1 via the first inter-chip interface 2117, and loads the first data DATA1 into the first memory 2116, based on the first interrupt command Int1, and provide the first data DATA1 to the first register 2113, and performs a write operation. The first inter-chip interface 2117 may include MIPI, etc. However, the technical spirit of the present disclosure is not limited thereto.

Further, the first processor 2114 may provide the first timing signal TI1 to the first latch 2112 to control a timing at which the first register 2113 provides the first control signal Ctrl1 to the first transceiver IP 2111.

The first processor 2114 may include at least one processor including a CPU or a GPU, or a microprocessor (MCU), or may be a portion of a processor.

The first memory 2116 may store therein a plurality of register addresses and a plurality of register data as a lookup table, based on the first interrupt command Int1. Therefore, the first processor 2114 loads the lookup table corresponding to the first interrupt command Int1, and provides data in the loaded lookup table to the first register 2113. The first memory 2116 may include SRAM (Static Random Access Memory). However, the present disclosure is not limited thereto.

The first processor 2114 controls the first register 2113 and the first memory 2116 via the first bus 2115. The first bus 2115 may be embodied as an APB or AHB interface. The technical spirit of the present disclosure is not limited thereto.

Although not shown in the drawing, the voltage supply device 211_2 may be connected to the first chip 211_1 via an inter-chip interface, and may receive a command from the voltage supply device 211_2 and provides power PWR to the first chip 211_1. The voltage supply device 211_2 may include LDO/PMIC, etc. The technical spirit of the present disclosure is not limited thereto.

The radio frequency integrated circuit 212 converts an intermediate band signal IFs input thereto into a baseband digital signal (e.g., modulation symbols: BBs), or converts a baseband digital signal BBs input thereto into an intermediate band signal IFs, and performs the beamforming on the baseband digital signal BBs. The beamforming may be, for example, digital beamforming. The beamforming may allow the baseband digital signal BBs to be multiplied by beamforming weights. In this connection, the beamforming weights may be used to change a magnitude and a phase of a signal, and may be referred to as a 'preceding matrix', a 'precoder', and the like.

The radio frequency integrated circuit 212 according to some example embodiments may be separated from the antenna module 211 and may be connected to the channel CH.

The radio frequency integrated circuit 212 includes a second transceiver IP 2121, a second latch 2122, a second register 2123, a second processor 2124, a second bus 2125, a second memory 2126, a second inter-chip interface 2127, an OR operator 2128, and/or a pulse generator 2129.

The second transceiver IP 2121 may be composed of a plurality of transceiver IPs. The second transceiver IP 2121 may include a switch SW, an amplifier LNA/PA, a mixer Mixer, a phase locked loop (PLL), a low pass filter (LPF), a digital to analog converter (DAC), an analog to digital converter ADC, and/or a digital front-end (DFE).

The second transceiver IP 2121 may be controlled by a plurality of second control signals Ctrl2 generated from the second register 2123 to be described later. Settings on the second register 2123 may be set based on the plurality of second control signals Ctrl2. Based on the settings, the second register 2123 may convert an intermediate band signal IFs input thereto from the antenna module 211 to a baseband digital signal BBs, or convert a baseband digital signal BBs input thereto to an intermediate band signal IFs, and may perform beamforming on the baseband digital signal BBs.

For example, a noise compensation amount, a beamforming weight, etc. may be set based on a DFE control signal Ctrl2_DFE of a DFE register 2123_1. The digital front-end (DFE) may perform sampling based on the DFB control signal Ctrl2_DFE. The digital front-end (DFE) may perform additional removal/reduction of or compensation for channel distortion of the sampled signal, and may filter noises received from the channel and may perform digital beamforming.

Sampling information and a reference error of each of the digital to analog converter DAC and the analog to digital converter ADC may be set based on a converter control signal Ctrl2_C generated from each of an ADC register 2123_2 and a DAC register 2123_3. Based on the above settings, the digital to analog converter DAC converts a baseband digital signal BBs input thereto to an intermediate band signal IFs, or the analog to digital converter ADC converts an intermediate band signal IFs input thereto to a baseband digital signal BBs.

A frequency band and a gain of the low-pass filter LPF may be set based on a filter control signal Ctrl2_F generated from each of a receive filter register 2123_4 and a transmit filter register 2123_5. Based on the above settings, the low-pass filter LPF performs a filtering operation on an analog signal.

Frequency adjustment information about the mixer Mixer, phase information about the phase locked loop PLL, etc. may be respectively set based on a mixer control signal Ctrl2_M and a PLL control signal Ctrl2_P respectively generated from a mixer register 2123_6 and a PLL register 2123_7. Based on the above settings, the mixer Mixer and the phase locked loop PLL respectively perform frequency and phase adjustment operations on the analog signal. The mixer Mixer may be embodied as an analog mixer that performs a frequency adjustment operation on the analog signal. However, the technical idea of the present disclosure is not limited thereto.

Gain information about the amplifier LNA/PA may be set based on an amplifier control signal Ctrl2_A generated from an amplifier register 2123_8. Based on the above setting, the amplifier LNA/PA performs a power amplification operation.

A connection structure between transmission and reception paths in the second transceiver IP 2121 and the horizontal channel/vertical channel CHh and CHv may be determined based on an antenna switch control signal Ctrl2_SW of the switch register 2123_9. The beamforming operation of the communication device 21 may be implemented in various manners according to the connection structure.

The second latch 2122 provides a second control signal Ctrl2 output from the second register 2123 to the second transceiver IP 2121 according to a second timing signal TI2. The second timing signal TI2 is provided from the second processor 2124 which will be described later. The second latch 2122 is controlled by the second processor 2124 based on the second timing signal TI2. However, a timing at which the second timing signal TI2 is input to the second latch 2122 may be adjusted based on a sync adjustment signal Sync provided from the modem 213. Thus, the second timing signal TI2 is converted to a second timing signal TI2' having the adjusted input timing.

The second register 2123 may be composed of a plurality of registers. Each of the registers may correspond to each transceiver IP. Each of the registers included in the second register 2123 may output a 32-bit sized control signal. The technical spirit of the present disclosure is not limited thereto.

The second register 2123 may include the DFE register 2123_1, the ADC register 2123_2, the DAC register 2123_3, the receive filter register 2123_4, the transmit filter register 2123_5, the mixer register 2123_6, the PLL register 2123_7, the amplifier register 2123_8 and/or the switch register 2123_9.

The second register 2123 receives second data DATA2 in a form of a lookup table stored in the second memory 2126 under control of the second processor 2124. The second register 2123 outputs the second control signal Ctrl2 based on the second data DATA2.

The second processor 2124 receives a second command CMD2 for control of the second transceiver IP 2121 as a second interrupt command Int2 via the second inter-chip interface 2127, and loads the second data DATA2 into the second memory 2126 based on the second interrupt command Int2, and provides the second data DATA2 to the second register 2123, and performs a write operation. The second inter-chip interface 2127 may include MIPI, etc. The technical spirit of the present disclosure is not limited thereto.

Further, the second processor 2124 provides the second timing signal TI2 to the second latch 2122 to control a timing at which the second register 2123 inputs the second control signal Ctrl2 to the second transceiver IP 2121.

The second processor 2124 may include at least one processor including a CPU, or a GPU, or a microprocessor (MCU), or may be a portion of a processor.

The second memory 2126 may store a plurality of register addresses and a plurality of register data as a lookup table, based on the second interrupt command Int2. Accordingly, the second processor 2124 loads the lookup table corresponding to the second interrupt command Int2 and provides data in the loaded lookup table to the second register 2123.

The second memory 2126 may include SRAM (Static Random Access Memory). However, the present disclosure is not limited thereto.

The pulse generator 2129 generates a pulse Pul based on the sync adjustment signal Sync from the modem 213. The OR operator 2128 generates the second timing signal TI2' whose input timing is adjusted based on the pulse Pul and the second timing signal TI2.

The modem 213 may perform channel encoding. For the channel encoding, the modem 213 may use at least one of a LDPC (low density parity check) code, a convolutional code, and/or a polar code. The technical spirit of the present disclosure is not limited thereto. The modem 213 may perform constellation mapping to generate modulation symbols.

The modem 213 includes a third processor 2131 and a global timer 2132. The third processor 2131 may access an internal operation of the modem 213 such as the channel encoding, and may provide each of the first command CMD1 for control of the first transceiver IP 2111 and the second command CMD2 for control of the second transceiver IP 2121 to each of the antenna module 211 and the radio frequency integrated circuit 212.

The global timer 2132 receives a reference clock Ref_clk from the host device 25 in FIG. 3, and provides the sync adjustment signal Sync to the radio frequency integrated circuit 212 based on the reference clock.

The global timer 2132 includes a phase locked loop 2132_1, a comparator 2132_2, a sync logic 2132_3 and/or a sync register 2132_4. The phase locked loop 2132_1 provides a count value count to the comparator 2132_2, based on the reference clock Ref_clk. The sync register 2132_4 provides an event value EV to the comparator 2132_2. The comparator 2132_2 compares the count value count and the event value EV with each other to generate a high/low signal H/L. The sync logic 2132_3 generates the sync adjustment signal Sync based on the high/low signal H/L.

The sync register 2132_4 generates the event value EV based on at least one of an operating voltage and an operation temperature of the communication device 21. The sync register 2132_4 outputs the event value EV at a predefined or alternatively, predetermined or desired period. The global timer 2132 generates the sync adjustment signal Sync at a predefined or alternatively, predetermined or desired period.

The global timer 2132 and the pulse generator 2129 may allow the modem 213 and the radio frequency integrated circuit 212 to be synchronized with each other such that an operation timing of the second transceiver IP 2121 may be precisely adjusted.

Figure 10:
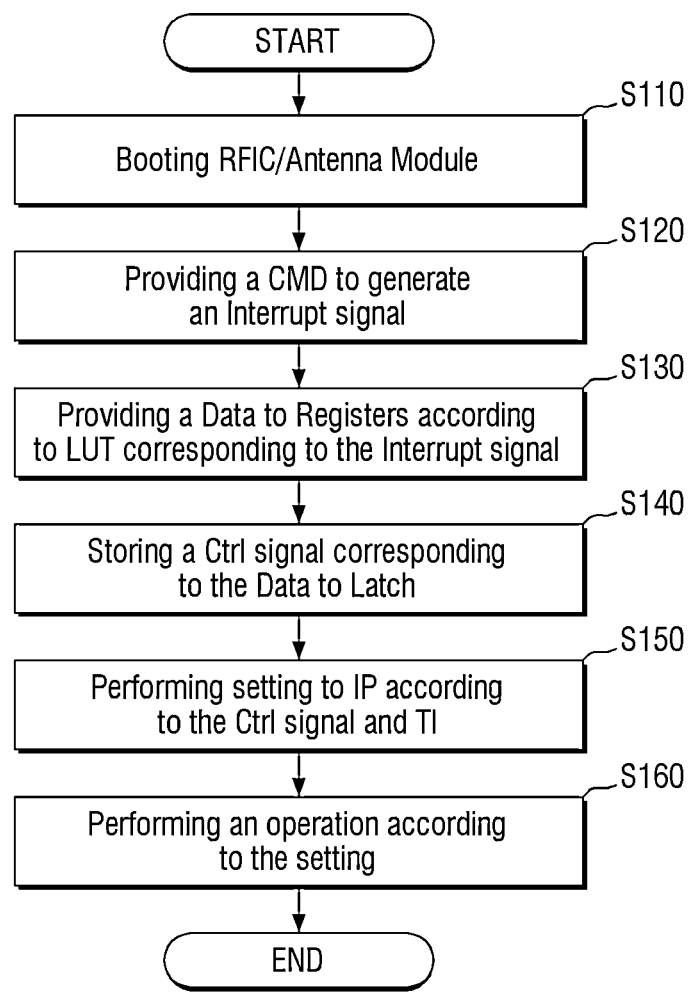
FIG. 10 is a flowchart for illustrating a communication device according to some example embodiments of the present disclosure.
Figure 11:
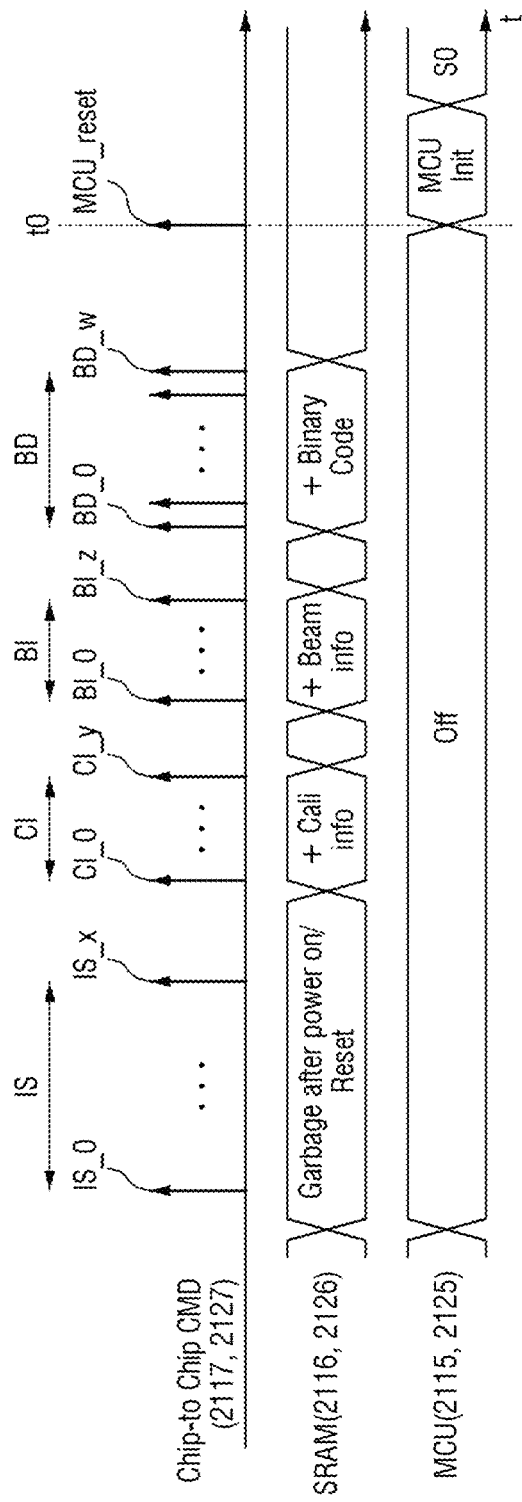
FIG. 11 and FIG. 12 are diagrams for illustrating an operation of a communication device according to some example embodiments of the present disclosure.
Figure 12:
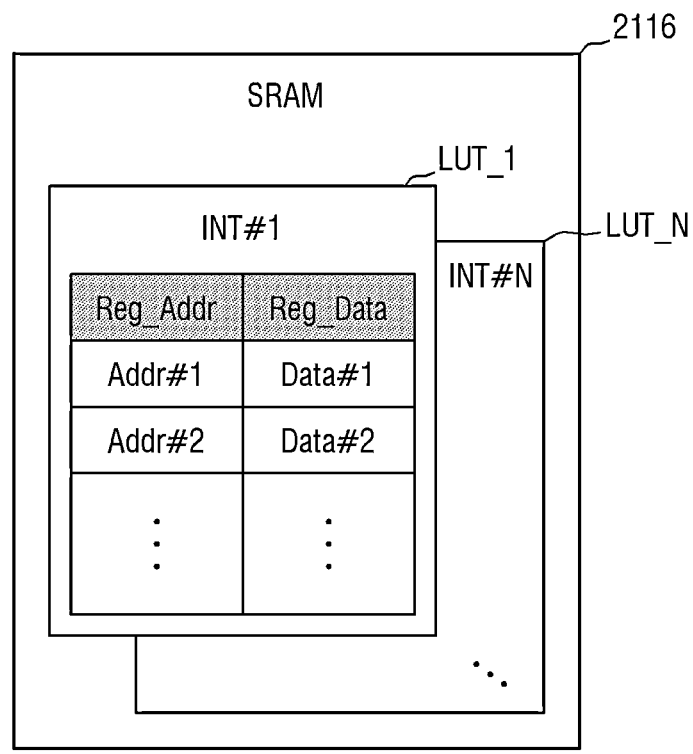

FIG. 10 is a flowchart for illustrating a communication device according to some example embodiments of the present disclosure. FIG. 11 and FIG. 12 are diagrams for illustrating an operation of a communication device according to some example embodiments of the present disclosure.

Referring to FIG. 10, when the communication device 21 is initially booted or reset, the antenna module 211 and the radio frequency integrated circuit 212 are booted in S110.

Referring to FIG. 11 and FIG. 12 together, before the first and second processors 2115 and 2125 are reset at a 0-th time-point t0, the modem 213 provides a plurality of commands for booting the first and second memories 2116 and 2126 via the first and second inter-chip interfaces 2117 and 2127.

Before the 0-th time-point t0, the modem 213 sequentially provides a required initial sequence command IS, a correction information command CI, a beam information command BI, and a binary code command BD to each of the first and second memories 2116 and 2126.

The modem 213 provides the required initial sequence command IS to each of the first and second memories 2116 and 2126 such that a required initial sequence operates on each of the first and second memories 2116 and 2126. The required initial sequence is related to operating voltage turn-on, bias circuit turn-on, and memory cleanup, etc.

The modem 213 provides the correction information command CI to each of the first and second memories 2116 and 2126 such that a portion of correction information is stored in each of the first and second memories 2116 and 2126. The modem 213 provides the beam information command BI to each of the first and second memories 2116 and 2126 such that the beam information is pre-stored in each of the first and second memories 2116 and 2126, thereby facilitating an operation of each of the first and second processors 2114 and 2124.

Thereafter, the modem 213 provides the binary code command BD to each of the first and second memories 2116 and 2126, such that a firmware binary code of each of the first and second processors 2114 and 2124 is stored in each of the first and second memories 2116 and 2126.

A time duration required to boot the components by the 0-th time-point t0 depends on a size of the binary code, and takes a relatively longer time in milliseconds (ms).

After the storage of the binary code and after 0-th time-point t0, each of the first and second processors 2114 and 2124 receives a start signal MCU Init. Then, each of the first and second processors 2114 and 2124 receives an external interrupt command and is ready to be controlled.

As a result of S110, a plurality of lookup tables LUT_1 to LUT-N are stored in each of the first and second memories 2116 and 2126. For convenience of description, the following description is centered on the plurality of lookup tables LUT_1 to LUT-N in the first memory 2116. However, it is evident that the description about the corresponding lookup table is equally applied to the second memory 2126.

Each of the lookup table LUT_1 to LUT-N corresponds to each of interrupt commands INT #1 to INT #N input to the first processor 2114. For example, when a first interrupt command INT #1 is provided to the first processor 2114, the first processor 2114 may provide the first data DATA1 (see FIG. 5) to the first register 2113 (see FIG. 5) based on the first lookup table LUT_1.

Each lookup table includes at least two register addresses Addr #1, Addr #2, . . . and at least two register data Data #1, Data #2, . . . .

The plurality of register address Addr #1, Addr #2, . . . may correspond to addresses of the plurality of first registers2113, respectively. The plurality of register data Data #1, Data #2, . . . may correspond to the plurality of first control signals Ctrl1, respectively.

Figure 13:
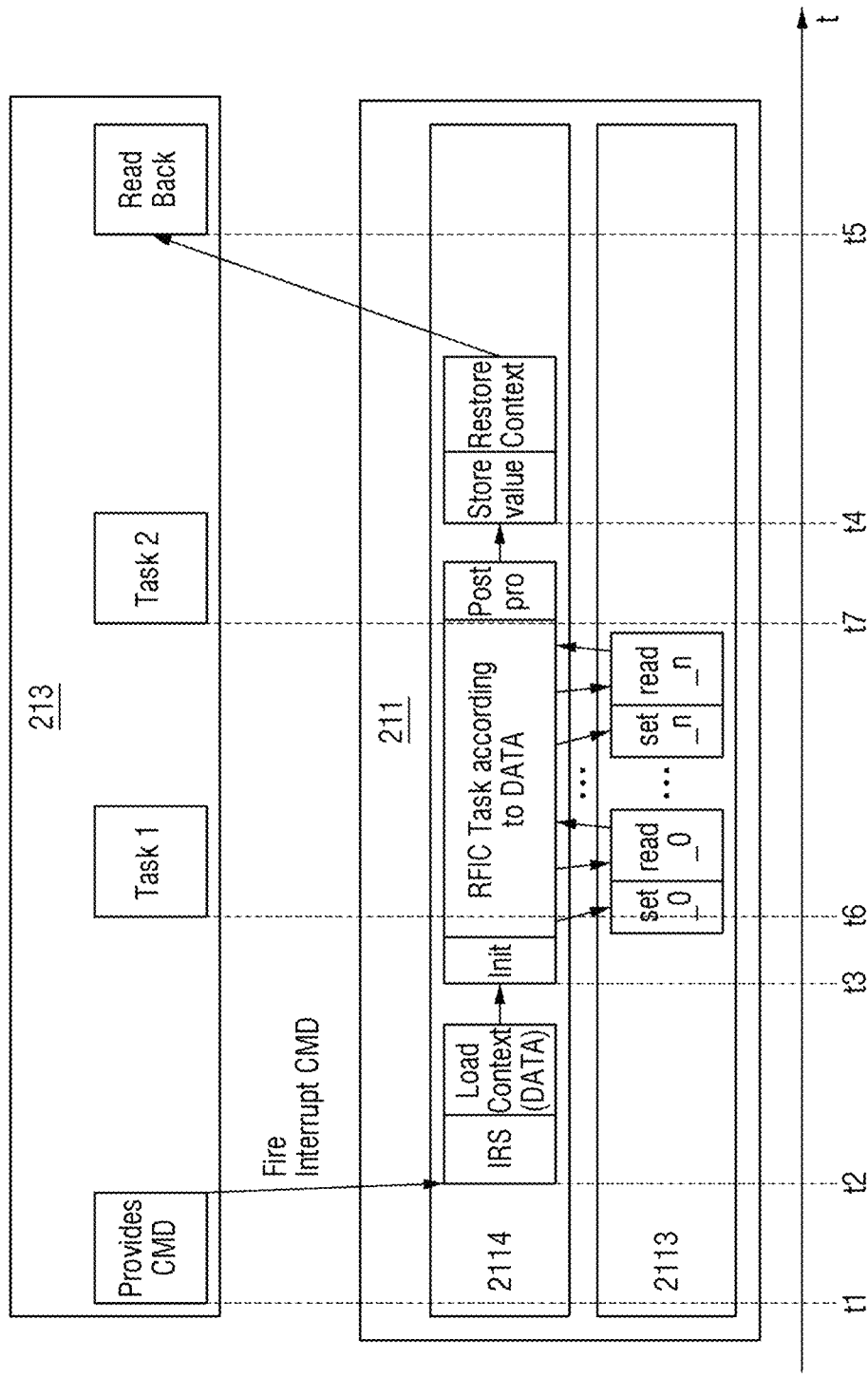
FIG. 13 to FIG. 14 are diagrams for illustrating an operation of a communication device according to some example embodiments of the present disclosure.
Figure 14:
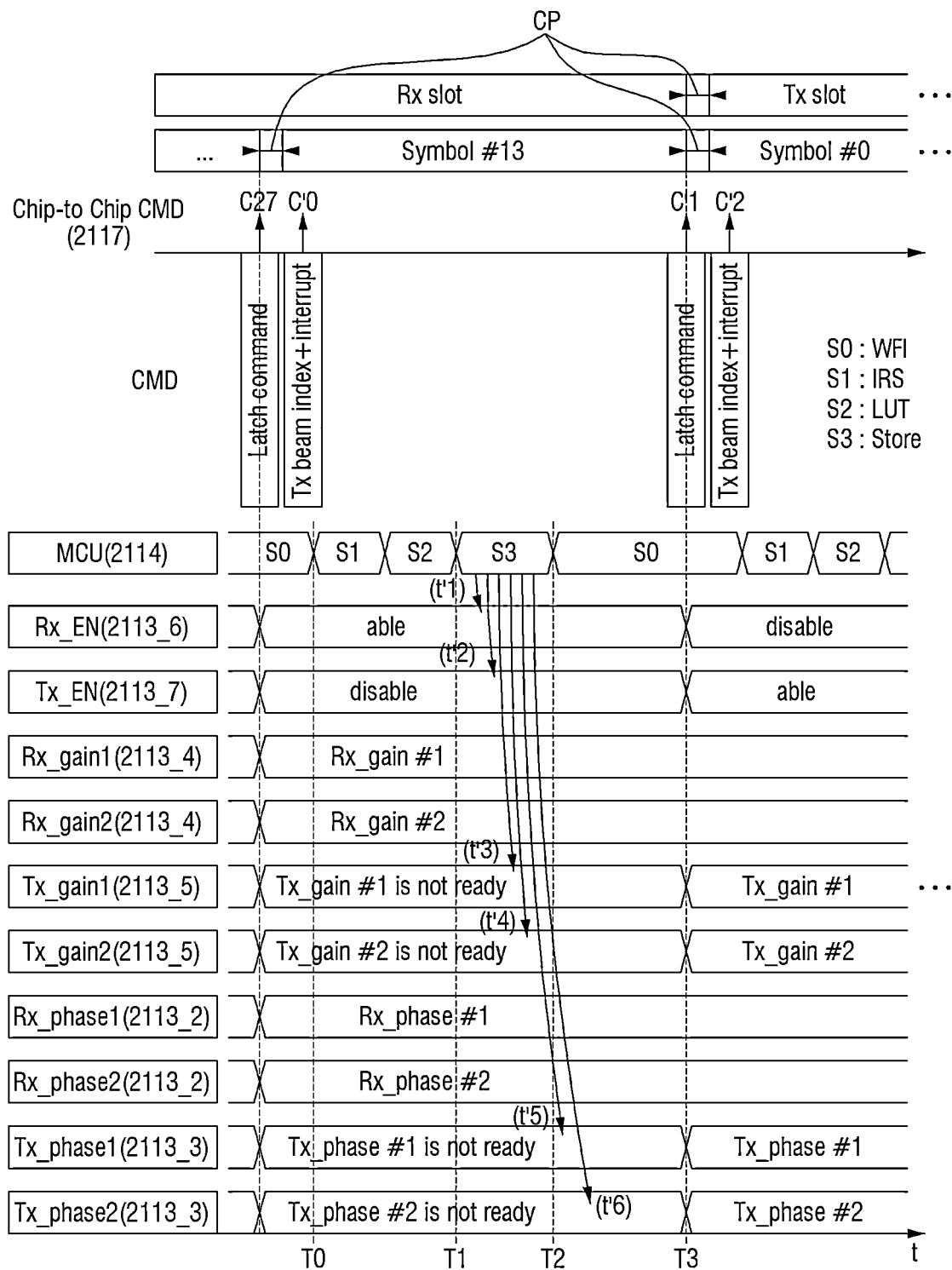

FIG. 13 to FIG. 14 are diagrams for illustrating an operation of a communication device according to some example embodiments of the present disclosure.

A subsequent operation of the communication device 21 will be described with reference to FIG. 13 to FIG. 14. For convenience, the following description is centered on the antenna module 211. However, it is obvious that the description about the corresponding antenna module 211 is equally applied to the radio frequency integrated circuit 212.

Referring for example to FIG. 13, the modem 213 provides the first command CMD1 to the antenna module 211 at a first time-point t1 and provides an interrupt command to the first processor 2114 in S120.

The first processor 2114 provides an interrupt registration signal IRS corresponding to the interrupt command to the first memory 2116 at a second time-point t2, and thus loads the first data DATA1 and provides the first data DATA1 to the first register 2113 in S130.

The first processor 2114 performs 0-th to n-th setting operations set_0 to set_n on the first register 2113 to generate the plurality of first control signals Ctrl1 (see FIG. 5) at a third time-point t3, and reads out result values of the 0-th to n-th setting operations set_0 to set_n.

Based on the read result values of the 0-th to n-th setting operations set_0 to set_n, the first register 2113 generates the plurality of first control signals Ctrl1 (see FIG. 5) and provides the same to the first latch 2112 for storage in S140.

Thereafter, settings on the first transceiver IP 211 are set based on the first timing signal TI1 (see FIG. 5) and the stored plurality of first control signals Ctrl1 in S150. The first transceiver IP 2111 performs an operation based on the settings in S160.

The first processor 2114 stores the read result values, and provides the read result values to the modem 213 at a fifth time-point t5, and thus provides a return signal to the interrupt command to complete an operation related to the first command CMD1.

The modem 213 performs a first task Task1 and a second task Task2 as an internal operation of the modem at a sixth time-point t6 and a seventh time-point t7, respectively, between the first time-point t1 at which the first command CMD1 is provided and the fifth time-point t5 at which the return signal is provided. The first task Task1, and the second task Task2 may correspond to the channel encoding. The technical spirit of the present disclosure is not limited thereto.

Therefore, as in the operation of FIG. 13, the operations of the modem 213 and the antenna module 211/radio frequency integrated circuit 212 may proceed simultaneously in a pipelining manner Thus, an overall operation efficiency of the communication device 21 may be increased.

Referring for example to FIG. 14, the antenna module 211 receives a 0-th command C'0 at a 0-th state S0 via the first inter-chip interface 2117 in S120. The 0-th state S0 refers to an interrupt command input waiting state WFI. The 0-th command C'0 may correspond to the first command CMD1 in FIG. 13.

Upon receiving the 0-th command C'0, a state of the first processor 2114 may change to a first state S1 at a 0-th time-point T0. In the first state S1, the first processor 2114 provides the interrupt registration signal IRS corresponding to the 0-th command C'0 to the first memory 2116. Thereafter, in a second state S2, the first processor 2114 loads the lookup table LUT corresponding to the interrupt registration signal IRS. In the first state S1 and the second state S2, the first processor 2114 may perform an operation corresponding to the operation of the second time-point t2 in FIG. 13.

Subsequently, the state of the first processor 2114 may change to a third state S3 at a time point between the first time-point T1 and the second time-point T2. In the third state S3, the first processor 2114 provides the first data DATA1 (see FIG. 5) corresponding to the lookup table LUT to the first register 2113 in S130, and provides the first control signal Ctrl1 to the first latch 2112 which in turn stores the same therein in S140.

In one example, at a first time-point t'1, the receive enable register 2113_6 stores a receive enable or disable Rx_EN into the first latch 2112. At a second time-point t'2, the transmit enable register 2113_7 stores a transmit enable or disable Tx_EN into the first latch 2112. In third and fourth time-points t'3 and t'4, the receive gain register 2113_4 respectively stores receive gain values Tx_gain1 and Tx_gain2 into the first latch 2112. At fifth and sixth time-points t'5 and t'6, the receive phase register 2113_2 respectively stores receive gain values Tx_phase1 and Tx_phase2 into the first latch 2112.

In a cyclic prefix (CP) time-zone between a 13-th symbol symbol #13 and a 0-th symbol symbol #0, the first command C'1 is input at a third time-point T3, and settings on the first transceiver IP 2111 are set based on the first command C'1 and the information stored in the first latch 2112 in S150. The first command C'1 may correspond to the first timing signal TI1 in FIG. 5.

Subsequently, after the third time-point T3, the first transceiver IP 2111 performs an operation on the 0-th symbol symbol #0, based on the above settings in S160.

While the first transceiver IP 2111 performs an operation on the 13-th symbol symbol #13 in a receive slot Rx slot, the first processor 2114 pre-stores information about the first control signal Ctrl1 into the first latch 2112. Thus, the setting operation has been completed in the cyclic prefix CP time-zone before the first transceiver IP 2111 performs the operation on the 0-th symbol symbol #0.

The operation of each of the first processor 2114, the first memory 2116, and the first register 2113 in the antenna module 211 may allow the setting operations on the first transceiver IP 2111 to be completed even in the short cyclic prefix CP time-zone.

Further, the setting operations on the plurality of transceiver IPs may be performed based on the lookup table LUT corresponding to one 0-th command C'0. Thus, the setting operation on the first transceiver IP 2111 may be completed even in a short symbol.

Figure 15:
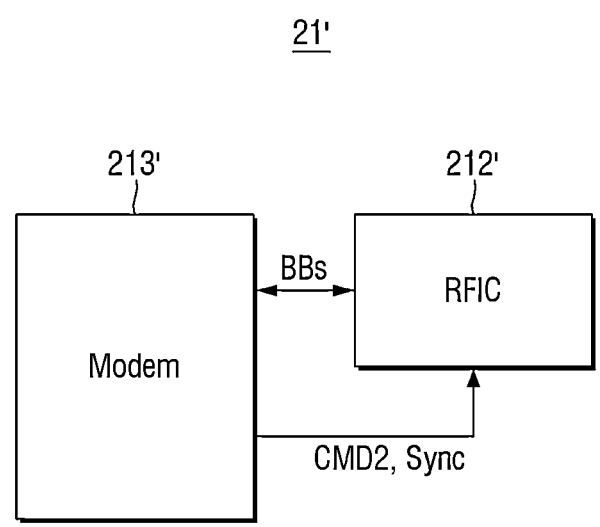
FIG. 15 and FIG. 16 are diagrams for illustrating a communication device according to some other example embodiments of the present disclosure.
Figure 16:
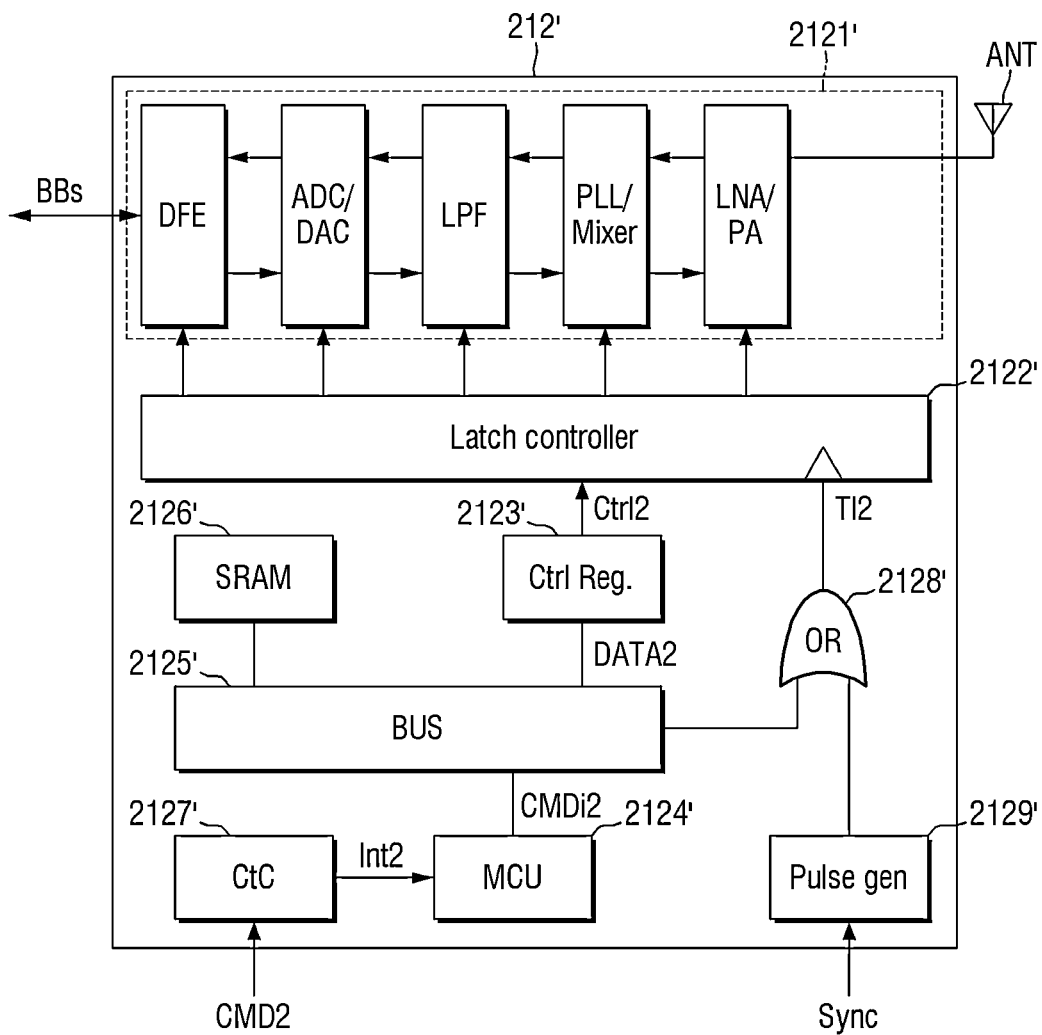

FIG. 15 and FIG. 16 are diagrams for illustrating a communication device according to some other example embodiments of the present disclosure.

Hereinafter, with reference to FIGS. 15 and 16, a radio frequency integrated circuit 212' in a communication device 21' according to some other example embodiments of the present disclosure will be described. The description will be focused on differences thereof from the communication devices 21 shown in FIGS. 4 to 7.

Referring to FIG. 15 and FIG. 16, the communication device 21' includes the radio frequency integrated circuit 212' and/or a modem 213'.

The radio frequency integrated circuit 212' corresponds to the antenna module 211 and the radio frequency integrated circuit 212 of FIG. 4 to FIG. 7, while the modem 213' corresponds to the modem 213 of FIG. 4 to FIG. 7.

The radio frequency integrated circuit 212' is embodied as a combination of the radio frequency integrated circuit 212 and the antenna module 213 of FIG. 4 to FIG. 7. A second transceiver IP 2121' includes one antenna ANT. A switch or a channel is absent between the antenna ANT and the amplifier LNA/PA.

Figure 17:
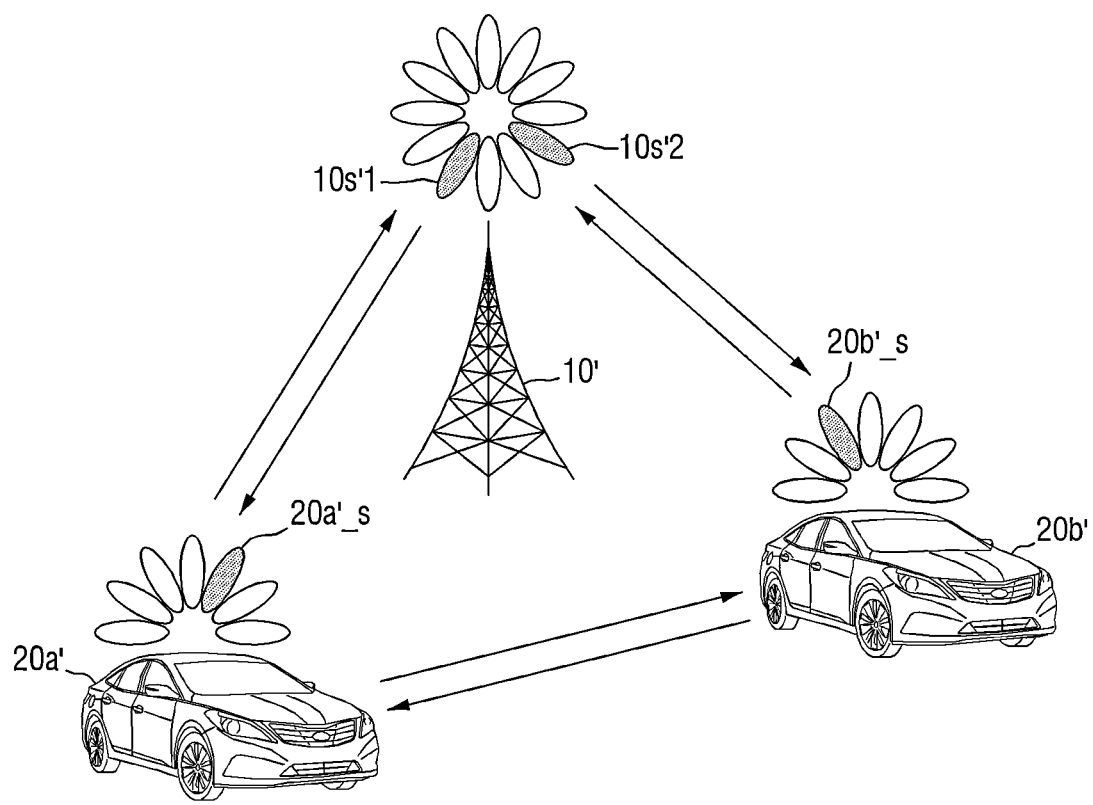
FIG. 17 is a diagram for illustrating a wireless communication system according to some other example embodiments of the present disclosure.

FIG. 17 is a diagram for illustrating a wireless communication system according to some other example embodiments of the present disclosure. Hereinafter, a wireless communication system according to some other example embodiments of the present disclosure will be described with reference to FIG. 17. The description will be focused on differences thereof from the wireless communication systems shown in FIG. 1.

The wireless communication system according to some other example embodiments of the present disclosure may also be applied to a smart car or a connected car. The wireless communication system may include a base station 10' and vehicles 20a' and 20b'.

The base station 10' and the vehicles 20a' and 20b' may correspond to the base station 10 and the terminals 20a and 20b in FIG. 1, respectively. Each of the vehicles 20a', and 20b' may include a communication device corresponding to the communication device 21 of each of the terminals 20a and 20b of FIG. 1. Description of an operation of the communication device may be replaced with the corresponding description of FIG. 10 to FIG. 14.

FIG. 18 is a graph for illustrating an effect of a communication device according to some example embodiments of the present disclosure.

Referring to FIG. 18, as the 5G communication standard is applied, a frequency of SCS (Sub-Carrier Spacing) increases. A task that must be carried out according to a symbol unit is required. Accordingly, each of the symbol and a cyclic prefix spacing (CP length) becomes smaller. Thus, the cyclic prefix spacing (CP length) required when the sub-carrier spacing (SCS) is 120 kHz or 240 kHz is reduced to 0.586 us and 0.293 us.

The communication device may have a requirement that the setting operations on the IP blocks should be completed within the cyclic prefix spacing (CP length).

Although the number of the transceiver IPs is increased due to the application of the beamforming scheme, the radio frequency integrated circuit according to the present disclosure may use the arrangement of the first and second processors 2114 and 2124, the first and second memories 2116 and 2126, and the first and second registers 2113 and 2123 to allow the time duration for which the setting operations on the plurality of transceiver IPs are completed to be reduced, such that the setting operations on the IP blocks have been completed within the cyclic prefix spacing (CP length).

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular example embodiment may be used singly or in combination with features, characteristics, and/or elements described in connection with other example embodiments unless otherwise specifically indicated. Accordingly, it will be understood by those of skill in the art that various changes in form and details may be made without departing from the spirit and scope of the present inventive concepts as set forth in the following claims.

What is claimed is:

1. A radio frequency integrated circuit (RFIC) comprising:
   a plurality of transceiver IPs (intellectual property), each transceiver IP among the plurality of transceiver IPs including an analog mixer and a filter, the analog mixer being configured to perform frequency adjustment on a signal input thereto to obtain a frequency adjusted signal, and the filter being configured to perform filtering on the frequency adjusted signal;
a plurality of registers respectively corresponding to the plurality of transceiver IPs, the plurality of registers being configured to generate a plurality of control signals, each respective control signal among the plurality of control signals being for controlling a corresponding transceiver IP among the plurality of transceiver IPs;
a memory configured to store therein a plurality of lookup tables, each lookup table including
a plurality of register addresses respectively corresponding to the plurality of registers, and
a plurality of register data, respectively corresponding to the plurality of registers; and
a processor configured to
receive a command related to a first lookup table from an external component, the first lookup table being among the plurality of lookup tables,
load the first lookup table corresponding to the command from the memory to the plurality of registers, and perform setting operations on the plurality of registers to generate the plurality of control signals based on the first lookup table.

2. The radio frequency integrated circuit of claim 1, further comprising:
a latch configured to provide each respective control signal among the plurality of control signals to a corresponding transceiver IP among the plurality of transceiver IPs,
wherein the processor is configured to provide a timing signal to the latch to control the latch.

3. The radio frequency integrated circuit of claim 2, wherein
the plurality of registers includes a first register and a second register, the first register corresponding to the analog mixer, and the second register corresponding to the filter;
the processor is configured to:
provide first register data contained in the first lookup table to the first register at a first time point, and
provide second register data contained in the first lookup table to the second register at a second time point;
the first register is configured to generate a first control signal based on the first register data;
the second register is configured to generate a second control signal based on the second register data;
the processor is configured to provide the timing signal at a third time point subsequent to the first time point and the second time point; and
each of the plurality of transceiver IPs is configured to perform the frequency adjustment and the filtering, based on the first control signal, the second control signals and the timing signal.

4. The radio frequency integrated circuit of claim 2, further comprising:
a signal generator configured to
receive a sync adjustment signal from the external component, and
adjust a timing at which the timing signal is input to the latch, based on the sync adjustment signal.

5. The radio frequency integrated circuit of claim 2, wherein the plurality of lookup tables include the first lookup table and a second lookup table, the second lookup table being different from the first lookup table.

6. The radio frequency integrated circuit of claim 5, wherein the processor is configured to control the plurality of registers, based on the plurality of register addresses and the plurality of register data.

7. The radio frequency integrated circuit of claim 1, wherein
the plurality of register addresses includes at least three register addresses; and
the plurality of register data includes at least three register data.

8. The radio frequency integrated circuit of claim 7, wherein
the plurality of register addresses respectively correspond to the plurality of registers; and
the plurality of control signals respectively correspond to the plurality of register data.

9. A communication device comprising:
a radio frequency integrated circuit (RFIC) including:
a plurality of transceiver IPs, each transceiver IP among the plurality of transceiver IPs including a filter and an analog mixer, the filter being configured to perform filtering on a signal input thereto, and the analog mixer being configured to perform frequency adjustment on the input signal,
a plurality of registers configured to generate a plurality of control signals, each respective control signal among the plurality of control signals being for controlling a corresponding transceiver IP among the plurality of transceiver IPs;
a latch configured to provide each respective control signal among the plurality of control signals to a corresponding transceiver IP among the plurality of transceiver IPs, and
a first processor configured to provide a timing signal to the latch to control the latch; and
a modem including:
a second processor configured to provide the input signal and a command to the radio frequency integrated circuit, the command corresponding to the plurality of control signals, and
a global timer configured to provide a sync adjustment signal to the radio frequency integrated circuit, the sync adjustment signal being configured to adjust a timing at which the timing signal is input to the latch,
wherein the first processor receives the command, provides data to the plurality of registers corresponding to the command and performs setting operation on the plurality of registers to generate the plurality of control signals based on the data.

10. The communication device of claim 9, wherein
the radio frequency integrated circuit further includes a memory configured to store the data in a form of a lookup table, the lookup table including
a plurality of register addresses respectively corresponding to the plurality of registers, and
a plurality of register data respectively corresponding to the plurality of registers; and
the first processor is configured to control the plurality of registers based on the lookup table.

11. The communication device of claim 10, wherein
the plurality of register addresses includes at least three register addresses; and
the plurality of register data includes at least three register data.

12. The communication device of claim 10, wherein
the lookup table includes a first lookup table and a second lookup table, the second lookup table being different from the first lookup table;
the command corresponds to the first lookup table; and
the first processor is configured to control the plurality of registers based on the plurality of register addresses and the plurality of register data.

13. The communication device of claim 10, wherein
the global timer includes a sync register configured to generate an event value based on at least one of an operating voltage or an operation temperature of the communication device; and
the global timer is configured to provide the sync adjustment signal to the radio frequency integrated circuit, based on the event value.

14. The communication device of claim 13, wherein
the sync register is configured to output the event value; and
the global timer is configured to generate the sync adjustment signal based on the event value.

15. The communication device of claim 9, wherein the second processor is configured to:
provide the command to the radio frequency integrated circuit at a first time point; and
receive a return signal corresponding to the command from the radio frequency integrated circuit at a second time point subsequent to the first time point; and
perform a control operation of the modem at a time point between the first time point and the second time point.

16. A communication device comprising:
an antenna module including a plurality of antennas and a beamformer, the plurality of antennas being configured to receive a plurality of radio signals, and the beamformer being configured to perform beamforming on the plurality of radio signals to generate an input signal;
a radio frequency integrated circuit (RFIC) configured to
perform frequency adjustment on the input signal to obtain a frequency adjusted signal, and
perform filtering on the input signal having the adjusted-frequency adjusted signal, thereby providing a baseband signal; and
a modem configured to
receive the baseband signal from the radio frequency integrated circuit, and
provide a command for controlling the frequency adjustment and the filtering to the radio frequency integrated circuit,
wherein the radio frequency integrated circuit (RFIC) includes:
a plurality of transceiver IPs, each transceiver IP among the plurality of transceiver IPs including an analog mixer and a filter, the analog mixer being configured to perform the frequency adjustment on the input signal, and the filter being configured to perform the filtering on the input signal having the adjusted frequency adjusted signal,
a plurality of registers respectively corresponding to the plurality of transceiver IPs, the plurality of registers being configured to generate a plurality of control signals, each respective control signal among the plurality of control signals being for controlling a corresponding transceiver IP among the plurality of transceiver IPs,
a memory configured to store therein a lookup table, the lookup table including
a plurality of register addresses respectively corresponding to the plurality of registers, and
a plurality of register data respectively corresponding to the plurality of registers, and
a processor configured to
receive the command the modem,
load the lookup table corresponding to the command from the memory to the plurality of registers, and
perform setting operations on the plurality of registers to generate the plurality of control signals based on the lookup table.

17. The communication device of claim 16, wherein
the radio frequency integrated circuit further includes a latch configured to provide each respective control signal among the plurality of control signals to a corresponding transceiver IP among the plurality of transceiver IPs; and
the processor is configured to provide a timing signal to the latch to control the latch.

18. The communication device of claim 17, wherein
the plurality of registers includes a first register and a second register, the first register corresponding to the analog mixer, and the second register corresponding to the filter;
the processor is configured to:
provide first register data contained in the lookup table to the first register at a first time point, and
provide second register data contained in the lookup table to the second register at a second time point;
the first register is configured to generate a first control signal based on the first register data;
the second register is configured to generate a second control signal based on the second register data;
the processor is configured to provide the timing signal at a third time point subsequent to the first time point and the second time points; and
each of the plurality of transceiver IPs is configured to perform the frequency adjustment and the filtering, based on the first control signal, the second control signals and the timing signal.

19. The communication device of claim 16, wherein
the lookup table includes a first lookup table and a second lookup table, the second lookup table being different from the first lookup table;
the command corresponds to the first lookup table; and
the processor is configured to control the plurality of registers, based on the plurality of register addresses and the plurality of register data.

20. The communication device of claim 16, wherein
the modem is configured to
provide the command to the radio frequency integrated circuit at a first time point, and
receive a return signal corresponding to the command from the radio frequency integrated circuit at a second time point subsequent to the first time point; and
the modem is configured to perform an internal operation of the modem at a time point between the first time point and the second time point.

* * * * *